United States Patent [19]
Kato et al.

[11] Patent Number: 5,153,154

[45] Date of Patent: Oct. 6, 1992

[54] DIELECTRIC CERAMIC COMPOSITION

[75] Inventors: Junichi Kato, Osaka; Hiroshi Kagata, Katano, both of Japan

[73] Assignee: Matsushita Electric Industrial Co., Ltd., Osaka, Japan

[21] Appl. No.: 724,884

[22] Filed: Jul. 2, 1991

[30] Foreign Application Priority Data

Jul. 3, 1990 [JP] Japan .................. 2-176007
Sep. 21, 1990 [JP] Japan .................. 2-253254

[51] Int. Cl.$^5$ .................................... C04B 35/02
[52] U.S. Cl. ................................ 501/135; 501/134
[58] Field of Search ........................ 501/134, 135

[56] References Cited

FOREIGN PATENT DOCUMENTS

| 46-001224 | 1/1971 | Japan | 501/135 |
| 55-121957 | 9/1980 | Japan | 501/135 |
| 57-160966 | 10/1982 | Japan | 501/135 |

*Primary Examiner*—Mark L. Bell
*Assistant Examiner*—Anthony J. Green
*Attorney, Agent, or Firm*—Wenderoth, Lind & Ponack

[57] ABSTRACT

A dielectric ceramic composition possessing a high relative dielectric constant, a high unloaded Q value, and an excellent temperature characteristic is expressed as $xPbO-y(Mg_{1/3}Nb_{2/3})O_2-zCaO$, where $x+y+z=1$, and x, y, z are in the following ranges, $0.05 \leq x \leq 0.45$, $0.4 \leq y \leq 0.55$, $0.15 \leq z \leq 0.4$, or expressed as $xPbO-y(Ni_{1/3}Nb_{2/3})O_2-zCaO$, where $x+y+z=1$, and x, y, z are in a quadrangular region with vertexes at A ($x=0.25$ $y=0.7$ $z=0.05$), B ($x=0.2$ $y=0.7$ $z=0.1$), C ($x=0.2$ $y=0.45$ $z=0.35$), and D ($x=0.35$ $y=0.45$ $z=0.2$), which are composition points of a ternary system with vertexes at PbO, $(Ni_{1/3}Nb_{2/3})O_2$, and CaO.

3 Claims, 3 Drawing Sheets

$(Pb_{1-x} Ca_x)(Mg_{1/3} Nb_{2/3})_{1-y}(Ni_{1/3} Nb_{2/3})_y O_3$

DIELECTRIC CERAMIC COMPOSITION

BACKGROUND OF THE INVENTION

1. Field of the Invention

The present invention relates to a dielectric ceramic used in a microwave region.

2. Description of the Prior Art

Recently, as communication using electromagnetic waves in the microwave region advances, such as mobile telephones, portable telephones and satellite broadcasting, it is desired to downsize the equipment. For this purpose, it is necessary to reduce the size of the individual components composing the equipment. The dielectric ceramics are incorporated in such devices as a dielectric resonator in the filter element or oscillator. The size of the dielectric resonator is inversely proportional to the square root of the dielectric constant of the dielectric material itself when using the same resonance mode, and therefore manufacture of small-sized dielectric resonator requires a material of high dielectric constant. Besides, other requirements of the dielectric ceramics include low loss in the microwave region or the high unloaded Q value, small changes of the resonant frequency with temperature, or small changes of the dielectric constant depending on temperature.

Dielectric materials hitherto used in this field include, among others, $Ba(Zn_{\frac{1}{3}}Ta_{\frac{2}{3}})O_3$, a $BaO-TiO_2$ composition in the system and their derivatives having some of the elements replaced by other elements. In all these materials, the relative dielectric constant is about 30, and it is too low to downsize the resonator. As a material with a higher relative dielectric constant, $BaO-TiO_2-Sm_2O_3$ composition was disclosed in U.S. Pat. No. 4,330,631 (May 18, 1982). This material has a relative dielectric constant of about 80, a high unloaded Q value of about 3000 at 2 to 4 GHz, and a small temperature coefficient of the relative dielectric constant. In addition, $BaO-PbO-TiO_2-Nd_2O_3$ is known to have a relative dielectric constant of over 90, as reported in the Journal of American Ceramic Society, vol. 67 (1984), pp.278–281.

However, for further reduction of the resonator size, materials of much higher dielectric constant are demanded, but materials possessing both high unloaded Q value and small temperature coefficient are not yet known. On the other hand, the temperature coefficient of the dielectric constant is generally negative when the dielectric constant is higher, but some materials have a positive temperature coefficient value such as $PbZrO_3$. It is hence attempted to reduce the temperature coefficient by combining materials having positive and negative temperature coefficient values. Materials having negative temperature coefficient include $TiO_2$ and $SrTiO_2$, among others, and materials having positive temperature coefficient are represented, for example, by $PbO-ZrO_2-Tb_4O_7$ which is disclosed in U.S. Pat. No. 4,849,384 (Jul. 18, 1989), as the system having lanthanide oxide added to $PbO-ZrO_2$. This material has a relative dielectric constant of over 100, and contributes greatly to downsizing of the resonator, but the temperature coefficient of the resonant frequency $\tau_f$ is about $-1,000$ ppm/°C., which shows a large change due to temperature.

SUMMARY OF THE INVENTION

It is hence an object of the invention to present a dielectric material of which the relative dielectric constant is higher than that of the hitherto known materials such as $BaO-TiO_2-Sm_2O_3$, loss is low in microwave region, and the temperature coefficient of dielectric constant is small.

To achieve this object, the invention presents a novel composition which is expressed as $xPbO-y(Mg_{\frac{1}{3}}Nb_{\frac{2}{3}})O_2-zCaO$, where $x+y+z=1$, and x, y, z are in the following ranges $0.05 \leq x \leq 0.45$, $0.4 \leq y \leq 0.55$, $0.15 \leq z \leq 0.4$. The invention also presents a novel composition which is expressed as $xPbO-y(Ni_{\frac{1}{3}}Nb_{\frac{2}{3}})O_2-zCaO$, where $x+y+z=1$, and x, y, z are in a quadrangular region with vertexes at A ($x=0.25$ $y=0.7$ $z=0.05$), B ($x=0.2$ $y=0.7$ $z=0.1$), C ($x=0.2$ $y=0.45$ $z=0.35$), and D ($x=0.35$ $y=0.45$ $z=0.2$), which are composition points of a ternary system with vertexes at PbO, $(Ni_{\frac{1}{3}}Nb_{\frac{2}{3}})O_2$ and CaO.

These novel compositions possess a high relative dielectric constant of over 35 in a microwave region of 2 to 6 GHz, as well as a temperature coefficient not exceeding 500 ppm/°C. and a high unloaded Q value of over 300.

The invention moreover presents a composition having a part of $(Mg_{\frac{1}{3}}Nb_{\frac{17}{0}})O_2$ of the composition formula expressed by $xPbO-y(Mg_{\frac{1}{3}}Nb_{\frac{2}{3}})O_2-zCao$ replaced by $(Ni_{\frac{1}{3}}Nb_{\frac{17}{0}})O_2$.

DESCRIPTION OF THE PREFERRED EMBODIMENTS

Embodiment 1

Figure 1:
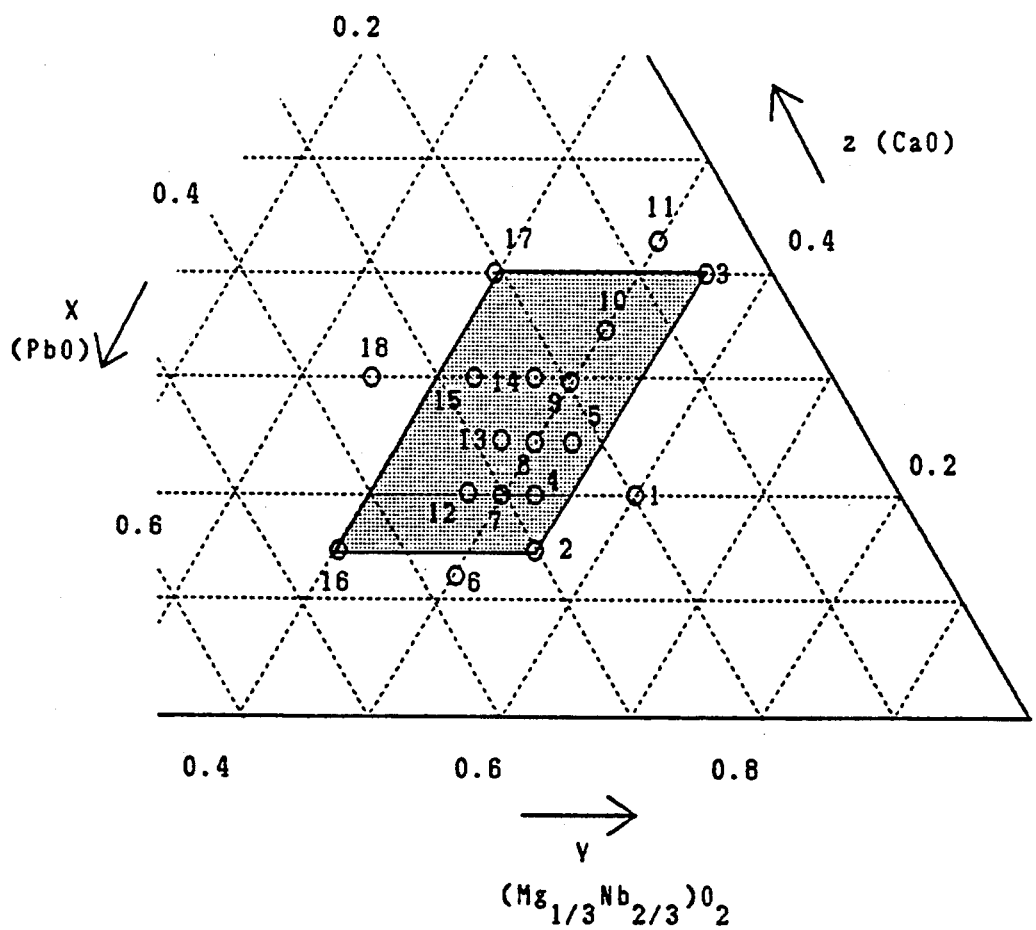
FIG. 1 is a diagram showing a ternary system of a desired composition range of $xPbO-y(Mg_{\frac{1}{3}}Nb_{\frac{2}{3}})O_2-zCaO$ system, in which the sample numbers correspond to Table 1.

As starting materials, MgO and $Nb_2O_5$ were weighed to be equivalent by mol ratio, and were put into a polyethylene ball mill containing stabilized zirconia pebbles, and purified water was added to the mixture, and mixed for 17 hours. After mixing, the slurry was dried, and put in an alumina crucible, and calcined for 2 hours at 1,000° C., synthesize $MgNb_2O_6$. Successively, the synthesized $MgNb_2O_6$, PbO and $CaCO_3$ were weighed according to x, y, z of the composition formula $xPbO-y(Mg_{\frac{1}{3}}Nb_{\frac{2}{3}})O_2-zCaO$ ) so as to form the composition shown in Table 1. These powder materials were mixed similarly to the above in the ball mill, and the slurry was dried, and calcined in an alumina crucible for 2 hours at 750° to 850° C. The calcined material was ground again for 17 hours in the ball mill and dried to obtain row powder. To this powder, as the binder, 5% aqueous solution of polyvinyl alcohol was added by 6 wt. %, and mixed, and the mixture was passed through a 32-mesh sieve to granulate it, and it was pressed into a column of 13 mm in diameter and about 5 mm in thickness at a pressure of 100 MPa. The formed material was then heated at 600° C. for 2 hours to burn out the binder, and the columns were put into a magnesia container, and were sintered for 2 hours while keeping them at 1,100° to 1,400° C. depending on the composition while preventing evaporation of PbO by spreading the surrounding with calcined powder of the same composition. The obtained column was measured by the dielectric resonator method to determine the resonant frequency and unloaded Q value. Besides, from the dimensions of the column and the resonant frequency, the relative dielectric constant was calculated.

TABLE 1

| Sample No. | Composition | | | firing temperature °C. | Relative dielectric constant | Unloaded Q | Temperature coefficient of resonant freq. $\tau_f$ ppm/°C. |
|---|---|---|---|---|---|---|---|
| | x PbO | y $(Mg_{\frac{1}{3}}Nb_{\frac{2}{3}})O_2$ | z CaO | | | | |
| *1 | 0.2 | 0.6 | 0.2 | not sinter | — | — | — |
| 2 | 0.3 | 0.55 | 0.15 | 1200 | 62 | 320 | +19 |
| 3 | 0.05 | 0.4 | 0.55 | 1400 | 38 | 2100 | −55 |
| 4 | 0.275 | 0.525 | 0.2 | 1150 | 45 | 350 | −47 |
| 5 | 0.225 | 0.525 | 0.25 | 1200 | 35 | 450 | −61 |
| *6 | 0.375 | 0.5 | 0.125 | 1250 | 323 | 60 | +600 |
| 7 | 0.3 | 0.5 | 0.2 | 1150 | 97 | 640 | +35 |
| 8 | 0.25 | 0.5 | 0.25 | 1250 | 88 | 1600 | +39 |
| 9 | 0.2 | 0.5 | 0.3 | 1250 | 73 | 1300 | +23 |
| 10 | 0.125 | 0.5 | 0.375 | 1300 | 46 | 2400 | −19 |
| *11 | 0.075 | 0.5 | 0.425 | 1350 | 28 | 2300 | −17 |
| 12 | 0.325 | 0.475 | 0.2 | 1150 | 107 | 660 | +95 |
| 13 | 0.275 | 0.475 | 0.25 | 1150 | 76 | 1000 | +22 |
| 14 | 0.225 | 0.475 | 0.3 | 1250 | 59 | 1100 | −11 |
| 15 | 0.275 | 0.425 | 0.3 | 1150 | 55 | 430 | −11 |
| 16 | 0.45 | 0.4 | 0.15 | 1100 | 86 | 140 | +74 |
| 17 | 0.2 | 0.4 | 0.4 | 1250 | 43 | 760 | −16 |
| *18 | 0.35 | 0.35 | 0.3 | 1200 | 37 | 160 | −27 |

*The asterisk refers to a comparative example out of the range of the invention.

The resonant frequency was 2 to 6 GHz. Moreover, at −25° C. and 85° C., the resonant frequency was measured, and on the basis of the value at 20° C., the temperature coefficient ($\tau_f$) was calculated. The results are shown in Table 1.

As clear from Table 1, in the composition formula xPbO-y $(Mg_{\frac{1}{3}}Nb_{\frac{2}{3}})O_2$-CaO, in which x, y, z are, in the ranges of $0.05 \leq x \leq 0.45$, $0.4 \leq y \leq 0.55$, $0.15 \leq z \leq 0.4$, that is, in the composition of the dotted range in FIG. 1, the dielectric constant is as high as 35 to 107, and the unloaded Q value is 300 or more, and the temperature coefficient of resonant frequency is 200 ppm/°C. and less. In particular, sample numbers 7, 8, 12, 13 have a relative dielectric constant of over 80, and present excellent characteristics with the unloaded Q value of over 400 and temperature coefficient of resonant frequency of 200 ppm/°C. and less.

However, the compositions not included in this range are not desired as the dielectric resonator for microwave use as explained below. That is, in the composition of which CaO is less than 0.15 (sample No. 6 in Table 1), the unloaded Q value is less than 100, and in the composition of which CaO is more than 0.4 (sample No. 11 in Table 1), the relative dielectric constant is less than 35. In the composition of which $(Mg_{\frac{1}{3}}Nb_{\frac{2}{3}})O_2$ is less than 0.4 (sample No. 16 in Table 1), the unloaded Q value is less than 200, and in the composition exceeding 0.55 (sample No. 1 in Table 1), sintered body is not dense at 1,400° C. or lower temperature.

Embodiment 2

Using NiO, $Nb_2I_5$, PbO and $CaCO_3$ as starting materials, they were weighed as specified to compose as shown in Table 2 according to x, y, z in the formula xPbO-y$(Ni_{\frac{1}{3}}Nb_{\frac{2}{3}})O_2$-zCaO, and the sinted samples were prepared in the same manner as in Embodiment 1, and the characteristics were measured. The results are shown in Table 2.

TABLE 2

| Sample No. | Composition | | | firing temperature °C. | Relative dielectric constant | Unloaded Q | Temperature coefficient of resonant freq. $\tau_f$ ppm/°C. |
|---|---|---|---|---|---|---|---|
| | x PbO | y $(Mg_{\frac{1}{3}}Nb_{\frac{2}{3}})O_2$ | z CaO | | | | |
| *1 | 0.2 | 0.75 | 0.05 | 1250 | 73 | 1150 | +550 |
| 2 | 0.25 | 0.7 | 0.05 | 1250 | 87 | 900 | +470 |
| 3 | 0.2 | 0.7 | 0.1 | 1250 | 69 | 920 | +460 |
| 4 | 0.25 | 0.65 | 0.1 | 1250 | 87 | 830 | +470 |
| 5 | 0.2 | 0.65 | 0.15 | 1300 | 65 | 800 | +430 |
| 6 | 0.25 | 0.6 | 0.15 | 1300 | 88 | 2250 | +280 |
| *7 | 0.35 | 0.55 | 0.1 | 1250 | 114 | 210 | +400 |
| 8 | 0.3 | 0.55 | 0.15 | 1350 | 90 | 2970 | +490 |
| 9 | 0.25 | 0.55 | 0.2 | 1150 | 110 | 660 | +150 |
| 10 | 0.2 | 0.55 | 0.25 | 1350 | 70 | 2550 | +400 |
| *11 | 0.375 | 0.5 | 0.125 | 1100 | 65 | 740 | +520 |
| 12 | 0.3 | 0.5 | 0.2 | 1150 | 97 | 940 | +150 |
| 13 | 0.25 | 0.5 | 0.25 | 1200 | 74 | 1460 | +110 |
| 14 | 0.2 | 0.5 | 0.3 | 1250 | 62 | 1700 | +10 |
| *15 | 0.15 | 0.5 | 0.35 | 1250 | 42 | 2450 | +180 |
| 16 | 0.35 | 0.45 | 0.2 | 1300 | 71 | 610 | +80 |
| 17 | 0.3 | 0.45 | 0.25 | 1300 | 65 | 660 | −140 |
| 18 | 0.25 | 0.45 | 0.2 | 1250 | 52 | 520 | −80 |
| 19 | 0.2 | 0.45 | 0.35 | 1150 | 50 | 650 | −90 |

TABLE 2-continued

| Sample No. | Composition x PbO | y (Mg₁/₃Nb₂/₃)O₂ | z CaO | firing temperature °C. | Relative dielectric constant | Unloaded Q | Temperature coefficient of resonant freq. τf ppm/°C. |
|---|---|---|---|---|---|---|---|
| *20 | 0.3 | 0.4 | 0.3 | 1100 | 44 | 220 | −150 |

*The asterisk refers to a comparative example out of the range of the invention.

Figure 2:
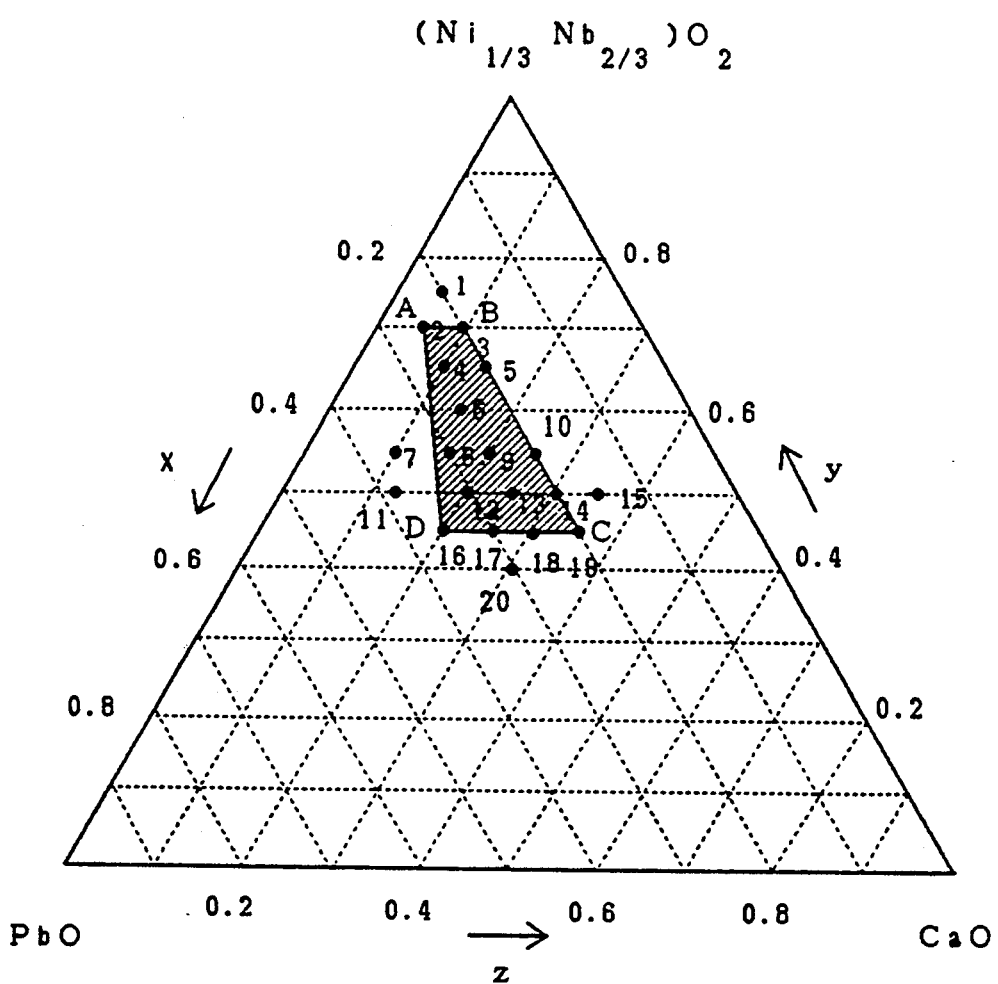
FIG. 2 is a diagram showing a ternary system of a desired composition range of $xPbO-y(Ni_{\frac{1}{3}})O_2-zCaO$ system, in which the sample numbers correspond to Table 2.

As clear from Table 2, in the composition formula expressed as xPbO-y(Ni₁/₃Nb₂/₃)O₂-zCaO where x, y, z are in a quadrangular region with vertexes at A (x=0.25 y=0.7 z=0.05), B (x=0.2 y=0.7 z=0.1), C (x=0.2 y=0.45 z=0.35 ), and D (x=0.35 y=0.45 z=0.2), which are composition points of a ternary system with vertexes at PbO, (Ni₁/₃Nb₂/₃)O₂ and CaO as shown in FIG. 2, the dielectric constant is as high as 50 to 110, and the unloaded Q value is 500 or more, and the temperature coefficient of the resonant frequency is 500 ppm/°C. and less. Particularly in sample numbers 14, 16, 18, 19, the relative dielectric constant is over 50, and the unloaded Q value is over 500, and the temperature coefficient of resonant frequency is less than 100 ppm/°C., which are excellent characteristics. However, in the composition in which x, y, z are not included in the quadrangle ABCD, the relative dielectric constant is less than 50, the unloaded Q value is less than 500, or the temperature coefficient of the resonant frequency is over 500 ppm/°C., and desired characteristics are not obtained as the dielectric resonator for microwave use.

Embodiment 3

The starting materials used in Embodiment 1 and Embodiment 2 were weighed as specified so that x and y of the formula $(Pb_{1-x}Ca_x)(Mg_{1/3}Nb_{2/3})_y(Ni_{1/3}Nb_{2/3})_{1-y}O_3$ may achieve the composition shown in Table 3, and the sinted samples were prepared in the same procedure as in Embodiment 1, and their characteristics were measured.

TABLE 3

| Sample No. | Composition x Ca | y (Ni₁/₃Nb₂/₃) | Firing temperature °C | Relative dielectric constant | Unloaded Q | Temperature coefficient of resonant freq. τf ppm/°C. |
|---|---|---|---|---|---|---|
| 1 | 0.3 | 1.0 | 1100 | 77 | 750 | +250 |
| 2 | 0.4 | 1.0 | 1150 | 97 | 940 | +150 |
| *3 | 0.65 | 1.0 | 1300 | 54 | 1800 | −75 |
| 4 | 0.4 | 0.9 | 1200 | 97 | 930 | +65 |
| *5 | 0.25 | 0.75 | 1100 | 171 | 160 | +110 |
| 6 | 0.4 | 0.75 | 1150 | 102 | 850 | +95 |
| 7 | 0.5 | 0.75 | 1200 | 74 | 1530 | +28 |
| *8 | 0.65 | 0.75 | 1300 | 58 | 1750 | −63 |
| *9 | 0.25 | 0.5 | 1100 | 175 | 240 | +150 |
| 10 | 0.4 | 0.5 | 1200 | 108 | 870 | +85 |
| 11 | 0.5 | 0.5 | 1250 | 81 | 1150 | +27 |
| *12 | 0.65 | 0.5 | 1350 | 56 | 1350 | −10 |
| *13 | 0.25 | 0.25 | 1200 | 214 | 180 | +260 |
| 14 | 0.4 | 0.25 | 1250 | 116 | 890 | +100 |
| 15 | 0.5 | 0.25 | 1300 | 84 | 1010 | +34 |
| *16 | 0.65 | 0.25 | 1400 | 58 | 1150 | +5 |
| 17 | 0.3 | 0.0 | 1200 | 162 | 220 | +400 |
| 18 | 0.6 | 0.0 | 1250 | 73 | 1300 | +25 |

*The asterisk refers to a comparative example out of the range of the invention.

The results are shown in Table 3.

Figure 3:
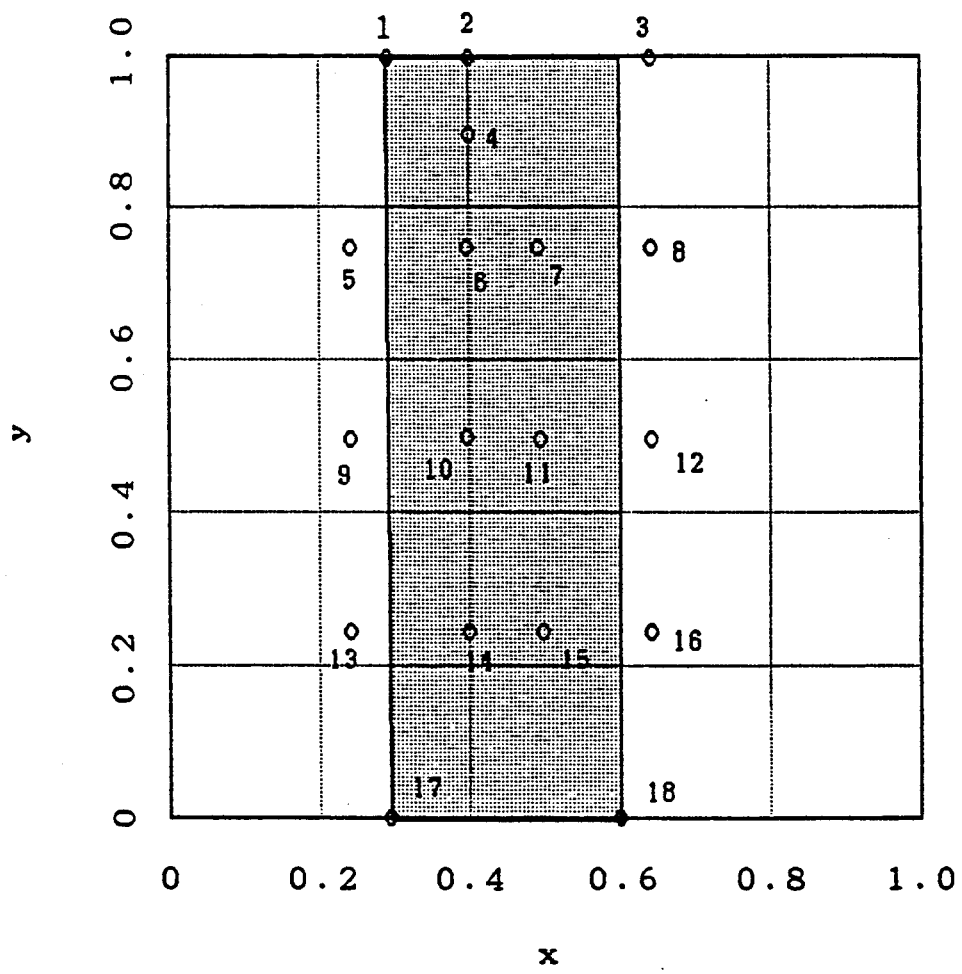
FIG. 3 is a structural diagram showing a desired composition range of $(Pb_{1-x}Ca_x)(Mg_{\frac{1}{3}}Nb_{\frac{2}{3}})_y(Ni_{\frac{1}{3}}Nb_{\frac{2}{3}})_{1-y}O_3$ system, in which sample numbers correspond to Table 3.

As clear from Table 3, in the composition formula expressed as $(Pb_{1-x}Ca_x)(Mg_{1/3}Nb_{2/3})_y(Ni_{1/3}Nb_{2/3})_{1-y}O_3$, x and y are included respectively in a range of $0.3 \leq x \leq 0.6$, $0.0 \leq y \leq 1.0$, that is, in the composition in the dotted range in FIG. 3, the dielectric constant is as high as 60, and the unloaded Q value is over 700, while the absolute value of temperature coefficient of the resonant frequency is less than 250 ppm/°C. In the composition where x is less than 0.3, the unloaded Q value is 300 and smaller, and in the composition where x is over 0.6, the dielectric constant is under 60.

Thus, the ceramic composition of the invention is composed of materials of which relative dielectric constant is over 100 in the microwave range, and these materials have the unloaded Q value of over 1,000, and the temperature coefficient is sufficiently small practically. Therefore, the ceramic composition of the invention is not only useful as the material for the dielectric resonator, but also effective to downsize the circuit when applied in the substrate for forming a microwave circuit.

What is claimed is:

1. A dielectric ceramic composition composed of lead oxide, magnesium oxide, niobium oxide and calcium oxide expressed by the formula, xPbO—y(Mg₁/₃Nb₂/₃)O₂—zCaO, where x, y, z are in the ranges:

| $0.05 \leq x \leq 0.45$ |
| $0.4 \leq y \leq 0.55$ |
| $0.15 \leq z \leq 0.4$ | where x+y+z=1.

2. A dielectric ceramic composition composed of lead oxide, nickel oxide, niobium oxide, and calcium oxide expressed by the formula, xPbO—y(Ni₁/₃Nb₂/₃)O₂—z CaO (where x+y+z=1), in which x, y, z are in a quadrangular region having vertexes at the following composition points A, B, C, D in a ternary system having vertexes at PbO, (Ni₁/₃Nb₂/₃)O₂, and CaO:

| A: | x = 0.25 | y = 0.7 | z = 0.05 |
| B: | x = 0.2 | y = 0.7 | z = 0.1 |
| C: | x = 0.2 | y = 0.45 | z = 0.35 |
| D: | x = 0.35 | y = 0.45 | z = 0.2. |

3. A dielectric ceramic composition expressed by the formula xPbO-13 y(Mg₁/₃Nb₂/₃)O₂—zCaO, in which the part expressed by (Mg₁/₃Nb₂/₃)O₂ is partially substituted by (Ni₁/₃Nb₂/₃)O₂ so that said composition is expressed by another composition formula $(Pb_{1-x}Ca_x)Mg_{1/3}Nb_{2/3})_{1-y}(Ni_{1/3}Nb_{2/3})_yO_3$ where x and y are in the following ranges:

$0.3 \leq x \leq 0.6$ $0.0 \leq y \leq 1.0.$

* * * * *